June 27, 1933.    F. ROBBINS    1,915,447
FRUIT PITTER
Filed Aug. 7, 1928    3 Sheets-Sheet 3
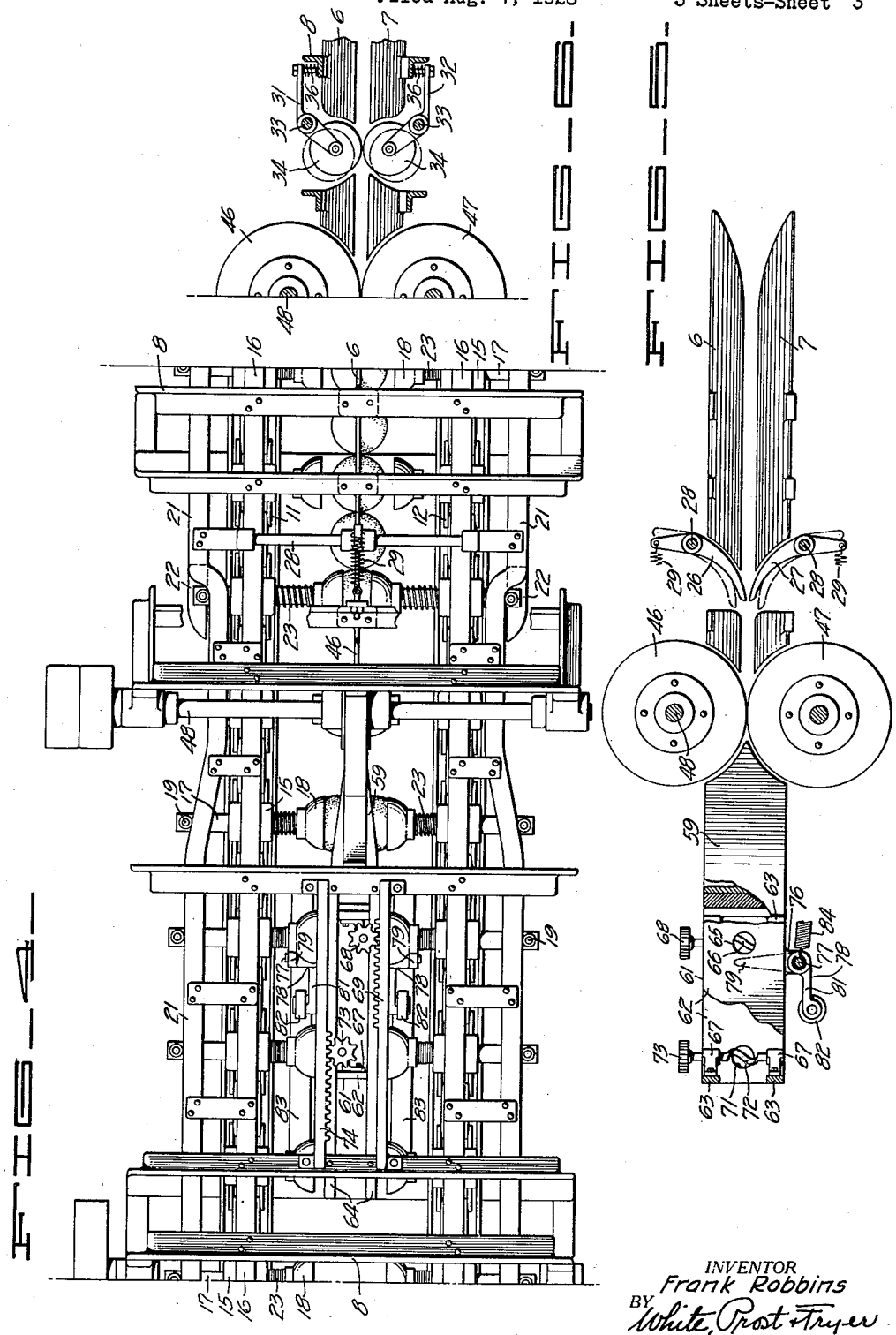
INVENTOR
*Frank Robbins*
BY
*White, Prost Fryer*
ATTORNEYS Patented June 27, 1933

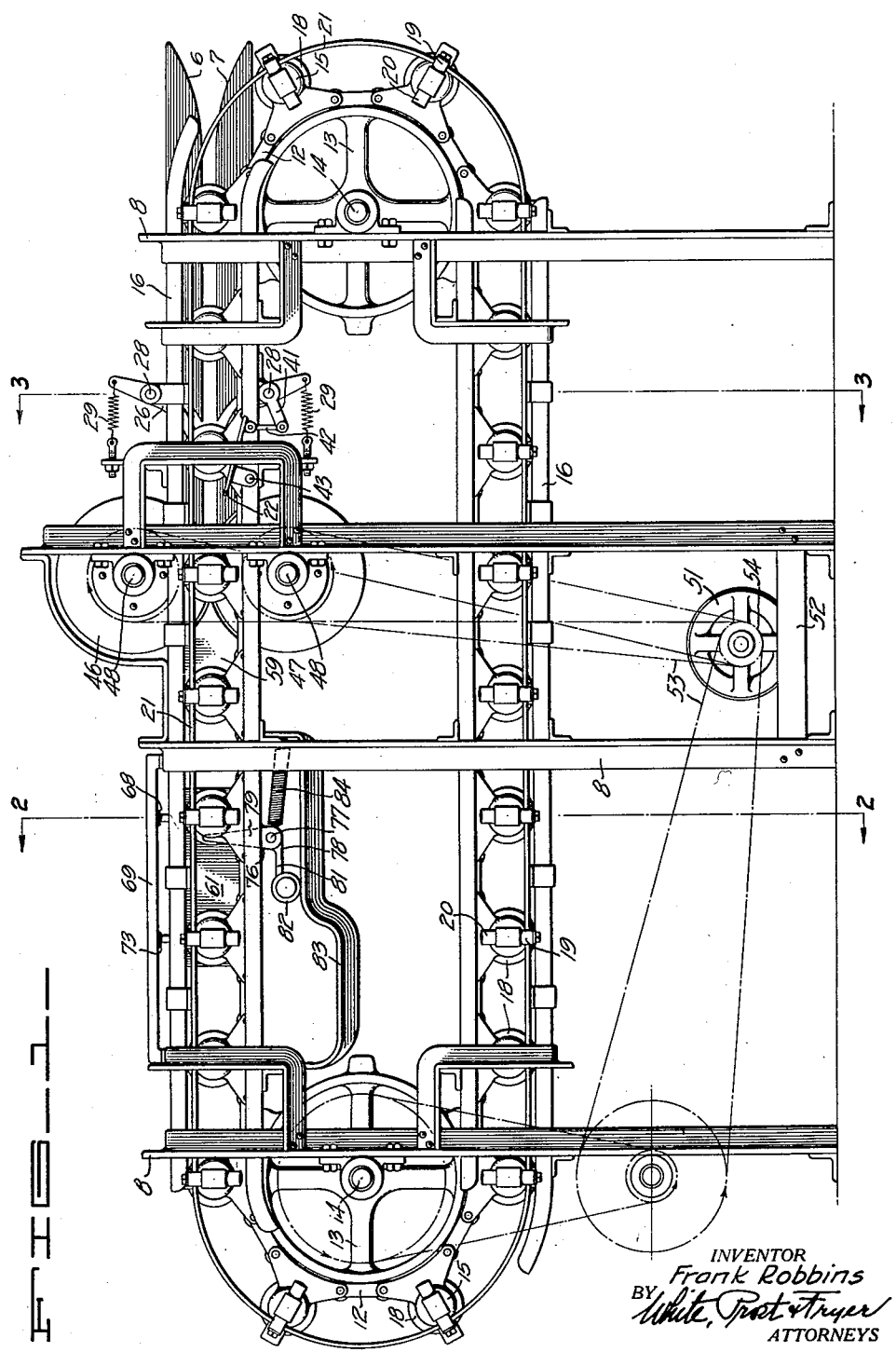

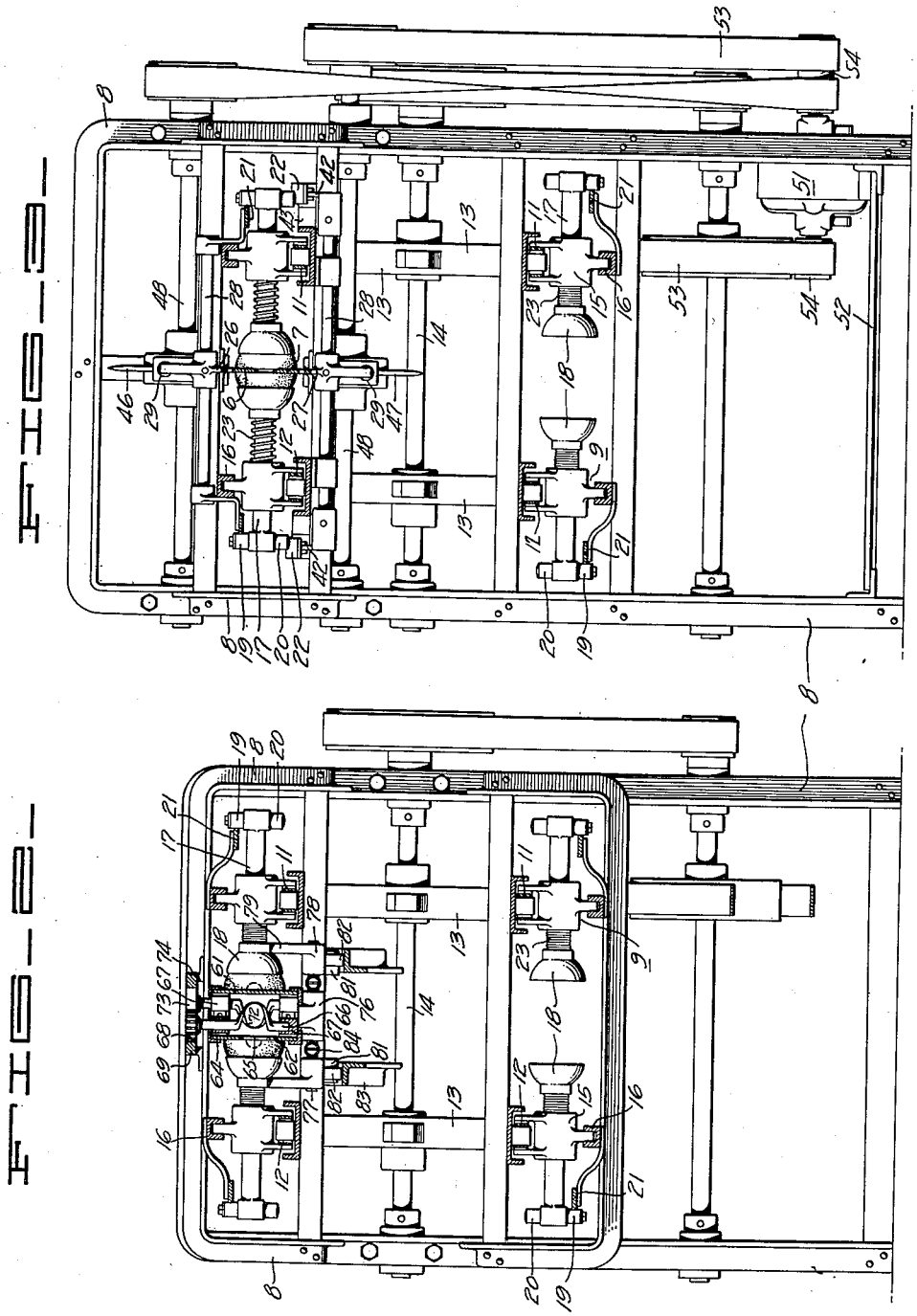

1,915,447

UNITED STATES PATENT OFFICE

FRANK ROBBINS, OF SACRAMENTO, CALIFORNIA, ASSIGNOR OF ONE-HALF TO LIBBY, McNEILL & LIBBY, OF SAN FRANCISCO, CALIFORNIA, A CORPORATION OF MAINE

FRUIT PITTER

Application filed August 7, 1928. Serial No. 297,961.

My machine relates to apparatus useful in handling fruit having pits which are removed prior to canning the fruit. It is at present customary to pit such fruit manually, but such a method of operating is extremely costly in addition to being slow. To overcome the difficulties of hand handling this type of fruit, a number of machines for performing the necessary operations have heretofore been proposed, among them a machine invented by me and described in my co-pending application entitled "Fruit pitting machine", bearing Serial No. 161,986.

The application identified describes a machine in which there is provided a relatively long conveyor onto which the fruit to be pitted, for example, peaches, is inserted by one or more operators. Each fruit is then carried thru saws which split it into two halves. These halves pass over a wedge-shaped separator which spread them apart and they then ride onto the opposite sides of a pitting wheel in the central portion of which are arranged pairs of pitting knives for cutting the half pit from the half fruit.

An object of my invention is to make more compact generally and to reduce the length of a fruit pitter.

Another object of my invention is to reduce the number of pitting knives necessary.

Another object of the present invention is to provide a fruit pitter on which a stationary guide for the fruit being introduced is provided.

Another object of my invention is to insure that the fruit is fed into the machine in properly timed relationship to the operation of the pitting mechanism.

The foregoing and other objects are attained in the embodiment of the invention shown in the drawings, in which Fig. 1 is a side elevation of a fruit pitter constructed in accordance with my invention.

Fig. 2 is a cross section of the machine, the plane of section being indicated by line 2—2 of Fig. 1.

Fig. 3 is likewise a cross section of the machine, the plane of section, however, being indicated by line 3—3 of Fig. 1.

Fig. 4 is a plan of the major portion of the machine, the end parts being broken away to reduce the size of the figure.

Fig. 5 is a somewhat diagrammatic view disclosing certain of the interior portions of the pitter.

Fig. 6 is a fragmentary view showing a modified form of the throat knives.

In its preferred form, the fruit pitter of my invention comprises a stationary guide on which the fruit is impaled and from which the properly positioned fruit is carried by a conveyor thru halving means to a reciprocating slide carrying the pitting mechanism for cutting the half pits from the half fruit.

Machines of the character to which my fruit pitter appertains are designed to sever a fruit, for example, a peach, on a median plane which not only bisects the flesh of the fruit, but divides the pit as well. The plane of greatest diameter of the pit usually extends from the flower end to the stem end and also contains an external, visible groove called the suture, which in every instance coincides with the greatest diameter of the pit.

In the present instance, the fruit is manually handled and is introduced into the machine in a predetermined position, usually with the suture coinciding with a vertical plane passing thru the central portion of the machine. For receiving the manually introduced fruit in a predetermined position, I provide a pair of guides 6 and 7 which are coplanar and are preferably arranged vertically one above the other. These guides extend longitudinally of the machine and have their adjacent edges sharpened and their leading ends flared so that the fruit is easily impaled thereon. The guides are preferably supported in the described position by a framework 8 which carries the entire mechanism of my fruit pitter and is conveniently fabricated of metal shapes, such as angles and straps. Usually the pair of guides is arranged centrally at the feeding end of the machine and in most instances both of them are employed, but for some uses, the upper guide 6 is dispensed with and the fruit is impaled on the lower guide 7 and is urged longitudinally of the machine by the operator. After one fruit is positioned on the guide or guides, a subsequent fruit is impaled thereon and forces the first fruit farther along. This operation is continued until the guides carry a number of pieces of fruit impaled in the predetermined position.

To carry the impaled fruit thru the various stages of the mechanism, I preferably provide a conveyor 9 usually comprising a pair of chains 11 and 12 running over sprockets 13 arranged in two pairs mounted on shafts 14 journalled on the end uprights of the framework 8. The chains are driven in unison so that the upper run advances from the feed end adjacent the guides 6 and 7 toward the discharge end of the machine. At spaced intervals, each of the chains carries a boss 15 preferably confined in a guide 16 secured to the framework 8 and being transversely apertured to receive the shank 17 of a cup 18. The cups are semi-spherical in interior and exterior contour and are arranged to hold closely the fruit being handled. Although the shanks 17 are loosely fitted within the bosses 15 to permit relative sliding movement, they are constrained in their motion by a pair of the shanks and adapted to cooperate with cam tracks 21 and 22. For assuring that the rollers 19 and 20 follow their respective cam tracks during the advance of the conveyors, there are interposed between the bosses 15 and the cups 19 coiled springs 23 surrounding the shanks 17. The cam tracks 21 on opposite sides of the machine are shaped to permit the cups 18 to approach each other, under the bias of the springs 23, in order to grasp a properly positioned fruit impaled on the guides 6 and 7. Since the cups 18 spring toward each other at a predetermined position of advance of the conveyor, it is desirable to have the fruit to be engaged also in the predetermined position, and to insure this action I preferably provide means for properly placing the fruit.

Usually the guides 6 and 7 are interrupted to provide room for a pair of lunar-shaped throat knives 26 and 27 which are opposed to each other and are preferably mounted in the same plane that contains the guides. Each of these knives 26 and 27 is conveniently mounted on a pivot such as a rotatable shaft 28 journalled in the framework of the machine. The contour of the throat knives is such that they substantially abut when in closed position and they are normally held thus by coil springs 29 secured to the extremities of the knives and anchored to the framework 8. The tension of the springs 29 is ordinarily such that an operator can feel a decided resistance when the impaled fruit being advanced by him along guides 6 and 7 encounters the throat knives. This is due to the fact that the pit of the fruit tends to force the throat knives back against the action of the springs 29. The resistance of the throat knives to moving apart is generally sufficient to indicate to the operator that the fruit is properly positioned, and he therefore then relaxes his pressure on the fruit while the cups 18 spring inwardly in the predetermined location and encompass and engage the impaled fruit. The advancing cups then carry the momentarily retarded fruit past the throat knives, spreading them as the fruit passes, and propel the fruit farther into the machine for subsequent operations. If desired, a sufficiently stiff spring 29 can be provided on each throat knife so that it is virtually impossible for an operator to force a fruit past the predetermined location, and so that the inwardly sprung cups 18 alone are effective to move the fruit farther.

As an alternative form for the throat knives, there is disclosed in Fig. 6 an arrangement of a pair of arms 31 and 32 which can be suitably pivoted on shafts 33 similar in all respects to shafts 28. These arms carry sharpened discs 34 at their extremities and are arranged to be urged together by coil springs 36 interposed between the framework 8 and the free ends of the arms 31. The discs 34 are free to rotate under the influence of advancing fruit so that they are not quickly dulled.

However, a different arrangement is sometimes desirable, and for that reason I have provided a mechanism which positively locks the fruit in predetermined position or, alternatively, does not permit the cups 18 to spring inwardly if the fruit is not properly placed. Preferably secured to one of the shafts 28 on which the throat knives 26 and 27 are mounted, is an arm 41 connected by a link 42 to the cam track 22. In this instance, the cam track is itself mounted eccentrically on a pivot 43 so that it can rock relative to the framework 8. As particularly indicated in Fig. 4, the contour of cam track 22 is considerably different than the contour of cam track 21. It is shaped to engage the lower roller 20 on each shank 17 and prevents the cup from springing inwardly at the predetermined location for engagement with the fruit. When the cam track 22 is in its raised or upper position, it intercepts the lower roller on the cup and carries it past the predetermined location on the guides 6 and 7 and prevents the engagement of the cup with the fruit. If, however, the throat knives are spread apart by the proper positioning of a fruit on the guides 6 and 7, the shaft 28 is rocked and tilts the cam track 22 so that the lower roller 20 of the shank 17 can pass over the depressed leading edge thereof and spring inwardly along the contour of cam track 21 to engage the properly positioned fruit.

It thus occurs that if a fruit is not advanced far enough along the guides 6 and 7 to spread apart the throat knives, the cam track 22 will not be rocked and the cups will continue to pass the predetermined location without springing inwardly toward each other. However, if the fruit is advanced into the proper location, the throat knives are sufficiently spread apart to remove the lower cam track 22 from the path of the advancing shank 17 and permit the cups to spring inwardly and grasp fruit. It will be noted that during the time that the shank and lower rollers 20 are passing over the tipped or inclined lower cam track 22, it is impossible for the track again to be turned into its horizontal or upper position; so that once a fruit is properly positioned between the throat knives, it is not released and cannot be further advanced until the cups have sprung inwardly to grasp the fruit and the rollers 20 clear the lower cam track. The operation of this mechanism is therefore to insure that a fruit will be advanced to the exactly correct position for engagement by the cups and no farther, and furthermore that the cups will not spring inwardly to grasp the fruit until the fruit is exactly located. This arrangement permits the operator to feed the fruit onto the guides 6 and 7 and at random advance them into the machine, relieving him of all care as to the accurate feeding of the fruit for engagement with the cups.

After the cups 18 have engaged the fruit, they carry it along the guides 6 and 7 on the far side of the throat knives to a pair of rapidly revolving disc knives or saws 46 and 47 which are mounted on transverse shafts 48 suitably journalled in the framework 8 of the machine. A driving motor 51 is supported on a suitable base 52 affixed in the framework 8 and by means of belts 53 and suitable pulleys 54 operates the revolving knives or saws 46 and 47 and the conveyor chains 11 and 12. The saws sever the fruit into two halves on the plane of greater diameter of the pit which is identified by the external suture and on which plane the flesh of the fruit has already been largely severed by the guides 6 and 7. Although the two halves of fruit are then entirely separate, they are advanced together by the cups advancing in unison, and pass over a wedge-shaped divider plate 59 which forces the half fruits apart against the urging of the springs 23.

Further advancement of the fruit halves under the urgency of the two conveyor chains 11 and 12, carries the fruit to opposite sides of a slide 61, mounted in the framework 8 for reciprocatory motion.

This slide comprises generally a hollow box made up of apertured sides 62, joined by blocks 63 and fitting within angle guides 64 suitably mounted on the framework 8 to permit free translation of the slide. One side 62 of the slide is pierced by an aperture 65 of sufficient size to permit the passage of a pitting knife 66 of the type disclosed in Patent No. 1,671,587 issued to Henry Johnson. This knife is capable of cutting the half pit from a half fruit in substantially a complete revolution and is therefore journalled with its axis of rotation vertical in slides 67 adjustably movable on blocks 63.

In order to rotate the pitting knife, there is provided on one end thereof a gear 68 meshing with a stationary rack 69 secured to the framework 8; so that during the translation of the slide 61, the pitting knife 66 is alternately rotated in opposite directions, the rotation in one direction being an active pitting rotation and the rotation in the opposite direction being a return to original position. The other side of the slide 61 is also provided with an aperture 71 in like manner cooperating with its own pitting knife 72 driven by a gear 73 and associated rack 74. The location of the apertures 65 and 71 is preferably such that the pitting knives 66 and 72 can be arranged in substantial longitudinal alinement so that the width of the slide 61 can be a minimum, thus enabling the divider plate 59 to be relatively narrow and correspondingly short, thereby increasing the compactness of the entire machine. Preferably, the distance between the center of aperture 65 and the center of aperture 71 is the same as the distance between the centers of two successive cups 18; so that when one cup is in registry with the aperture 65 a succeeding cup on the conveyor chain on the other side of the slide is also in registry with the aperture 71.

In order to drive the slide 61 in unison with the conveyor chains 11 and 12, I preferably provide the slide with a depending boss 76 in which is affixed a cross shaft 77 carrying at each end a bell crank 78. Each bell crank is provided with an upwardly extending arm 79 of sufficient length to project into the path of the advancing cup shanks 17. The location of the upstanding arms 79 is such that they are contacted by the cups when one of the cups is in exact registration with the aperture 65 and also when a cup on the opposite side is in exact registration with the aperture 71.

To prevent the bell cranks from pivoting when their upstanding arms 79 are contacted by the cups 18, the other arm 81 of each of them is provided at its extremity with a roller 82, running on an irregularly shaped track 83 mounted in the framework 8. The contour of the tracks 83 is such that the slide 61 is advanced usually an amount somewhat less than the center to center distance of the cups 18, after which the rollers 82 are permitted to drop, letting the cups pass over the depressed end of the upwardly extending arm 79, and thus releasing the slide 61 from advancing movement in unison with the conveyor. To return the slide to its initial position, there are provided relatively heavy coil springs 84, secured at one end to the framework 8 and at the other end to the shaft 77.

The operation of the slide mechanism is to advance the slides in exact unison with the action of the conveyor every time cups come into exact registry with apertures 65 and 71. The advancing movement of the slide causes the pitting knives to revolve, thereby cutting the half pits from the half fruits held in position by the cups 18. The slide thus makes one reciprocation for each pair of cups with which it comes into registry, and removes in sequence the half pits from the two half fruits held in juxtaposition with it. The pits of the fruit drop thru the central portions of the slide and can be collected if desired, while the half fruits minus their pits advance over the pair of sprockets 13 at the discharge end of the machine. In this region, the cam track 21 is spread apart slightly, so that the cups 18 are withdrawn and the fruit halves are free to fall out of the machine into a suitable receptacle.

The fruit pitter described herein is not only a simple, compact machine, but it operates very rapidly and effects the pitting of fruit with a small number of parts. Furthermore, the positioning of fruit within the machine is accurately controlled so that a perfect job of pitting is done in every instance.

It is to be understood that I do not limit myself to the form of fruit pitter shown and described herein, as the invention, as set forth in the following claims may be embodied in a plurality of forms.

I claim:

1. A fruit pitter comprising a stationary guide on which the fruit is impaled, periodically operating means for engaging said impaled fruit, and means responsive to the position of fruit on said guide for rendering said engaging means inoperative.

2. A fruit pitter comprising means for holding the fruit, periodically operating means for engaging said held fruit, and means responsive to the position of said held fruit for rendering said engaging means inoperative.

3. A fruit pitter comprising means for holding the fruit, means for engaging said held fruit, and means responsive to the position of said held fruit for rendering said engaging means inoperative.

4. A fruit pitter comprising means for holding the fruit, and means adapted to move to fruit holding position only when said fruit is in a predetermined held position.

5. A fruit pitter comprising a stationary guide on which the fruit is impaled, an arm adapted to be actuated by fruit occupying a predetermined position on said guide, a conveyor adapted to advance in either of two paths, in one of which said conveyor engages said fruit, and means responsive to the actuation of said arm for selecting the path of advance of said conveyor.

6. A fruit pitter comprising a stationary guide on which the fruit is impaled, a conveyor paralleling said guide, cups on said conveyor for engaging said impaled fruit, means for biasing said cups to engage said fruit, means for preventing said cups from engaging said fruit, and an arm adapted to be actuated by said impaled fruit for rendering inoperative said preventing means.

7. A fruit pitter comprising a reciprocating slide, means for holding a fruit in a fixed position on said slide, a rotatable pitting knife mounted on said slide, a gear connected to said knife, and a relatively stationary rack in mesh with said gear.

8. A fruit pitter comprising a slide having apertures therein, means for conveying a half-fruit on each side of said slide, and serially arranged pitting knives operable thru said apertures for pitting said half-fruits in different positions of advance.

9. A fruit pitter comprising a slide having apertures in opposite sides thereof in longitudinally staggered locations, and pitting knives mounted on said slide substantially in file to operate thru said apertures.

10. A fruit pitter comprising a reciprocating slide, pitting means on said slide, a conveyor advancing substantially parallel to said slide for carrying fruit into registry with said pitting means, a projection on said conveyor, and means on said slide for engaging said projection for advancing said pitting means and said fruit conjointly.

11. A fruit pitter comprising a conveyor for advancing fruit a reciprocable slide adapted to register with said fruit, pitting means on said slide, and means periodically interengaging for joining said slide to said conveyor for advancement therewith.

12. In a machine of the character described, a slidable element having an opening formed in the side thereof, means for supporting a fruit section against one side of the element and to register with the opening, and cutting means actuated by movement of the element mounted upon the opposite side of the element and adapted to pass through the opening to enter the fruit and extract the pit therefrom.

13. In a machine of the character described, the combination of supporting means, an element slidably mounted thereon and having an opening formed therein, a fruit section carrier mounted on the frame and adapted to move a fruit section into registration with said opening, means for advancing the element and carrier as a unit, and pit extracting means mounted upon the element and operable through said opening.

14. In a machine of the character described, the combination of supporting means, an element having an opening therein slidably mounted on said support, means for supporting a fruit section against one side of the element to register with the opening therein, and pit extracting means mounted on the element and actuated by movement thereof relative to the supporting frame and adapted to pass through said opening to encircle the pit in the fruit section.

15. In a machine of the character described, the combination of a movable element having an opening formed therein, means for seating and supporting a fruit section on one side of the element in registration with said opening, and a pit removing knife revolubly mounted on the other side of the element and actuated by movement thereof and adapted to rotate through said opening and encircle the pit portion in the fruit section.

16. In a machine of the character described, a suporting means, an apertured element slidably mounted thereon, resilient means for normally holding the element in a given position, a fruit section carrier adapted to move a fruit section into registration with the aperture in the element, engageable means inserted between the carrier and element whereby they are caused to move as a unit when said registration is effected, pit removing means operative through the aperture in the element and actuated by movement of the element relative to its support, and means for disengaging the element and carrier at a given point in their movement.

17. A pitter for fruit having a suture comprising a planar guide having a boundary of predetermined contour on which the fruit is impaled with the suture coplanar with said guide and with respect to which the fully impaled fruit is movable, means for removing the pit from the fruit, means for moving said impaled fruit in a path similar to said contour and transferring said fruit to said pitting means, and means for synchronizing said removing means and said moving means.

18. A pitter for fruit having a suture comprising a blade of predetermined contour on which the fruit is impaled with the suture coplanar with said blade, means for removing the pit from said fruit, means for moving said fruit along said blade in a path similar to said contour and to said pitting means, and means for synchronizing said removing means and said moving means.

19. A pitter for fruit having a suture comprising a planar guide on which the fruit is impaled with the suture coplanar with said guide, means for removing the pit from said fruit, means out of the plane of said guide for moving said fruit along said guide to said pitting means, and means for synchronizing said removing means and said moving means.

20. A pitter for fruit having a suture comprising a monoplanar blade of a predetermined contour on which the fruit is initially impaled with the suture coplanar with said blade, means effective only after said fruit is impaled for moving said fruit along said blade in a path similar to said contour, means for removing the pit from said fruit, and means for synchronizing said removing means and said moving means.

21. A pitter for fruit having a suture comprising a stationary, rigid guide on which the fruit is impaled with the suture coplanar with said guide, means for engaging said fruit only after said fruit is impaled and moving said impaled fruit along said guide, means for pitting said fruit, and means for synchronizing said engaging means and said pitting means.

22. A fruit pitter comprising a guide along which fruit having a pit is adapted to be advanced, and an arm in the path of said advancing pit, said arm being engageable by said fruit for resisting the advance of said fruit and being movable out of the path of said pit upon advancement of said fruit.

23. A fruit pitter comprising a guide along which fruit having a pit is adapted to be advanced, a knife movable into and out of the path of advance of said pit, and yielding means for urging said knife into the path of advance of said pit.

24. A fruit pitter comprising a blade on which fruit having a pit is impaled and along which the fruit is adapted to be advanced, a knife coplanar with said blade and movable into the path of advance of said pit, and means for urging said knife substantially transversely into the path of advance of said pit.

25. A fruit pitter comprising a pair of opposed, coplanar blades on which fruit having a pit is impaled and along which the fruit is adapted to be advanced, a pair of mutually approachable knives coplanar with said blades and forming in the path of said pit a throat converging in the direction of advance of said fruit, and means for urging said knives to approach each other.

26. A fruit pitter comprising a conveyor for advancing the fruit at a predetermined rate, a reciprocating slide adapted to advance parallel to said conveyor and at said predetermined rate, and means on said slide adapted to register with and pit fruit advanced by said conveyor.

27. A fruit pitter comprising a conveyor for advancing the fruit at a predetermined rate, a slide reciprocating at the same rate of advance as said conveyor, and means on said slide for pitting fruit being advanced by said conveyor.

28. A fruit pitter comprising a conveyor for advancing the fruit at a predetermined rate and in a predetermined direction, a reciprocating slide parallel to said conveyor and adapted to advance in said direction, means for reciprocating said slide at the same rate of advance as said conveyor, and means on said slide for pitting fruit advancing on said conveyor.

29. A fruit pitter comprising a reciprocating slide adapted to contact with a half-fruit, said slide having an aperture therein adapted to register with the half-pit in said half-fruit, means for moving said half-fruit and said slide in unison, and means including a rotary knife mounted on said slide and operable through said aperture in said slide for pitting the contacting fruit.

30. A fruit pitter comprising a reciprocating slide having an aperture therein adapted to register with a half-pit in a half-fruit, means for holding said half-fruit stationary with respect to said slide, a pitting knife rotatably mounted on said slide, and means for rotating said knife through said aperture during the reciprocation of said slide.

In testimony whereof, I have hereunto set my hand.

FRANK ROBBINS.